United States Patent [19]

Kazan et al.

[11] Patent Number: 4,878,213
[45] Date of Patent: Oct. 31, 1989

[54] SYSTEM FOR RECORDING AND READOUT OF INFORMATION AT ATOMIC SCALE DENSITIES AND METHOD THEREFOR

[75] Inventors: Benjamin Kazan, Los Altos; Stig B. M. Hagstrom, Menlo Park, both of Calif.

[73] Assignee: Xerox Corporation, Stamford, Conn.

[21] Appl. No.: 253,165

[22] Filed: Oct. 3, 1988

Related U.S. Application Data

[63] Continuation of Ser. No. 651,396, Sep. 14, 1984, abandoned.

[51] Int. Cl.$^4$ .............................................. G11B 9/00
[52] U.S. Cl. .................................... 369/126; 346/1.1; 346/158; 365/118; 430/31
[58] Field of Search ..................... 346/1.1, 156, 158; 365/118, 174; 369/13, 101, 126; 430/31, 900

[56] References Cited

U.S. PATENT DOCUMENTS

| | | | |
|---|---|---|---|
| 3,660,087 | 5/1972 | Kaspaul et al. | 346/158 X |
| 3,668,106 | 6/1972 | Ota | 204/299 |
| 3,761,895 | 9/1973 | Ellis et al. | 365/118 |
| 3,761,951 | 9/1973 | Inoue et al. | 346/74 ES |
| 3,783,196 | 1/1974 | Stanley | 179/100.1 B |
| 3,814,975 | 6/1974 | Wolfe et al. | 313/336 |
| 3,818,493 | 6/1974 | Slack | 346/74 EB |
| 3,886,530 | 5/1975 | Haber | 340/173 CR |
| 4,032,901 | 6/1977 | Levinthal | 340/173 NC |
| 4,042,936 | 8/1977 | Yoshikawa | 346/1.1 |
| 4,059,443 | 11/1977 | Okumura | 430/31 X |
| 4,133,047 | 1/1979 | Levinthal | 365/118 |
| 4,213,192 | 7/1980 | Christensen, Sr. | 365/118 |
| 4,340,953 | 7/1982 | Iwamura et al. | 369/126 |
| 4,343,993 | 8/1982 | Binning et al. | 250/306 |
| 4,494,857 | 1/1985 | Ueno et al. | 430/31 X |
| 4,575,822 | 3/1986 | Quate | 365/174 |

FOREIGN PATENT DOCUMENTS

| | | |
|---|---|---|
| 0027517 | 4/1981 | European Pat. Off. . |
| 0038865 | 11/1981 | European Pat. Off. . |
| 0095521 | 12/1983 | European Pat. Off. . |
| 2060980 | 3/1983 | United Kingdom . |

OTHER PUBLICATIONS

Binning et al, "The Scanning Tunneling Microscope", Scientific American, pp. 50–56, Aug. 85.

Binning et al; "Surface Studies by Scanning Tunneling Microscopy", Phys. Rev. Letters, vol. 49(1), pp. 57–61, 7/5/82.

Binning et al, "7×7 Reconstruction on Si(III) Resolved in Real Space"; Phys. Rev. Letters, vol. 50(2), pp. 120–123 (1/10/83).

Gwynne, "IBM Researchers Utilize Vacuum Tunneling for High Resolution Microscopy Technique", Industrial R&D, pp. 72–73 (May, 73).

"A Review of 'Electrofax' Behavior"; Amick; RCA Review, pp. 453–769.

"Xerography and Related Processes"; Dessauer & Clark; The Focal Press, pp. 59–61, ©1965.

Kazan et al, "Image-Storage Panels Based on Field Effect Control of Conductivity", Proc. of IEEE, vol. 56(3), pp. 285–295, Mar. 68.

Mochel et al, "Electron Beam Writing on A 20 Å Scale/N Metal B–Aluminas", App. Physics Letters, vol. 42(4), pp. 392–394, 2/83.

*Primary Examiner*—Aristotelis M. Psitos
*Attorney, Agent, or Firm*—W. Douglas Carothers, Jr.

[57] ABSTRACT

A recording and readout information system having atomic scale densities comprises a recording medium having a carrier and means to form a pattern of atomic particles on the surface of the carrier. The atomic particles having an affinity for the carrier and can adhere to the surface to form a relatively adhesive and stable bond. The pattern of atomic particles produced on the carrier are representative of recorded information, e.g. binary represented information, of ultra high density based upon the size and spacing of such particles, which is in the range, for example, of 5 Å (0.5 nm) to 10 Å (1 nm). A preferred embodiment of the invention comprises a recording medium with an adsorbent carrier, means to form a pattern of adsorbate atomic particles on the surface of the adsorbent carrier, the adsorbate atomic particles having an adsorptive affinity for the adsorbent carrier. The adsorptive particles having an adsorptive affinity for the adsorbent carrier due, at least in part, to electrical attraction characteristics between the adsorbate atomic particles and the adsorbent carrier. Readout means, utilizing the tunnel current effect, is employed to determine the presence or absence of the atomic particles on the surface of the carrier and produce an electrical signal representative of the pattern of recorded information on the recording medium.

18 Claims, 4 Drawing Sheets

SYSTEM FOR RECORDING AND READOUT OF INFORMATION AT ATOMIC SCALE DENSITIES AND METHOD THEREFOR

This is a continuation of application Ser. No. 651,396 filed Sept. 14, 1984, now abandoned.

BACKGROUND OF THE INVENTION

This invention relates generally to novel ultra high density information recording or storage and readout or playback system utilizing recording densities in the atomic scale range.

In the various arts known for recording information and readout or playback of recorded information, artisans continue to pursue greater recording densities. The most popular example of such endeavors of increasing storage densities is the present development of magnetic recording media having perpendicular magnetic anisotropy to increase magnetic recording densities are compared to that available in in-plane magnetic anistropy. More recently, optical type and magneto-optic type of recording systems, i.e, systems of the type depending upon the employment of a beam of light for reading or writing and limited in spot size by the wavelength of light used, have been developed and some have entered the market place with recording densities of several magnitudes greater than that available for magnetic recording media.

Recently, there has been developed a high resolution microscopy technique known as scanning tunneling microscopy (STM). STM permits the resolving of features on a surface in the range below 10 Å (1 nm), e.g., vertical feature positions as small as 0.1 Å (0.01 nm) and horizontal feature separations down to 6 Å (0.6 nm). A discussion of STM can be found in U.S. Pat. No. 4,343,993 to Binnig et al. and in the articles of G. Binning et al. "Surface Studies by Scanning Tunneling Microscopy", Physical Review Letters; Volume 49, No. 1, pp. 57–61 (July 5, 1982) and G. Binning et al. "7X7 Reconstruction On Si (111) Resolved in Real Space", Physical Review Letters, Volume 50, No. 2, pp. 120–123 (Jan. 10, 1983).

As made known from these references, the "tunneling effect" is utilized to determine contour and the topography and, for example, of crystalline surfaces. The effect is based upon the probability that a limited number of electrons are capable of tunneling through a barrier comprising, for example, a thin blocking layer in a solid body, e.g. a conductor or semiconductor material. A high vacuum also represents such a tunnel barrier. The tunnel effect recognizes that a limited number of electrons in a potential field can tunnel the barrier even at low potential differences. The number of electrons per unit time that penetrate the barrier, e.g., a vacuum gap, is termed tunnel current. The tunnel current established across a vacuum gap established between two solid surfaces, e.g., a pair of spaced electrodes, will vary as the distance between the two is varied. However, the gap must be very small e.g., in the range of 10 Å (1 nm) to 100 Å (10 nm). Thus, if one electrode is a surface whose topography is under investigation and the other electrode is a very fine metal point, probe or stylus, for a fixed potential different between the electrodes, the tunnel current will vary with the minute irregularities in distance between the probe and the surface being examined as the probe is scanned across its surface.

Rather than measure a varying tunnel current, it is the objective of Binnig et al. to maintain a constant tunnel current as the probe scans the examined surface. This is accomplished by moving the probe tip toward and away from the examined surface to maintain a constant spacing between the probe tip and the surface. This can be done by monitoring the tunnel current and utilizing it as feedback signal to maintain the probe tip continuously at a predetermined spacing from the surface under investigation. A highly accurate piezoelectric driver, for example, may move the probe toward or away from the examined surface as the tunnel current respectively decreases or increases. The probe is scanned in the X and Y directions above the examined sample by X and Y piezo drivers as the Z or vertical piezo driver constantly changes the probe vertical position in accordance with variations in the sample contour by means of a closed loop feedback control system. The varying driving voltage of the Z piezo driver represents aa electronic image of the examined surface contour assuming that the work function is constant.

Taking into account the very small Angstrom range detecting capabilities of STM, this capability may be harnessed to provide a recording and playback storage technique having an ultra high recording density sever orders of magnitude greater than the best presently known storage densities obtainable with optical disk recording systems. In these optical disk systems, the recording and readout is limited by the size of the optical spot, which in turn is determined by the wavelength of light used. For example, the spot size may be of the order of one micron. By contrast, using the concept of the tunnel current effect, a recorded spot or representation could be created in the 5 Å (0.5 nm) to 10 Å (1 nm) range.

The problem, however, is how to utilize the tunnel current effect in a practical manner to provide such an ultra high density recording and readout system.

SUMMARY OF THE INVENTION

According to this invention, a recording and readout information system having atomic scale densities comprises a recording medium having a carrier and means to form a pattern of atomic particles on the surface of the carrier. The atomic particles having an affinity for the carrier and can adhere to the surface to form a relatively adhesive and stable bond. The pattern of atomic particles produced or formed on the carrier are representative of recorded information, e.g. binary represented information, of ultra high density based upon the size and spacing of such particles, which is in the range, for example, of 5 Å (0.5 nm) to 10 Å (1 nm). A preferred embodiment of the invention comprises a recording medium having an adsorbent carrier, means to form a pattern of adsorbate atomic particles on the surface of the adsorbent carrier, the adsorbant atomic particles having an adsorptive affinity for the adsorbent carrier. The adsorptive particles having an adsorptive affinity for the adsorbent carrier due, at least in part, to electrical attraction characteristics between the adsorbate atomic particles and the adsorbent carrier. Readout means, utilizing the tunnel current effect, is employed to determine the presence or absence of the adsorbate atomic particles on the surface of the adsorbent carrier and produce an electrical signal representative of the pattern of recorded information on the recording medium.

An adsorbent carrier is preferrably ZnO but may also be selected from the group consisting of ZnO, $ZnIn_2S_4$, $In_2O_3$ and $TiO_2$. In the case of such an adsorbent carrier, the adsorbate atomic particles comprise oxygen atoms.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
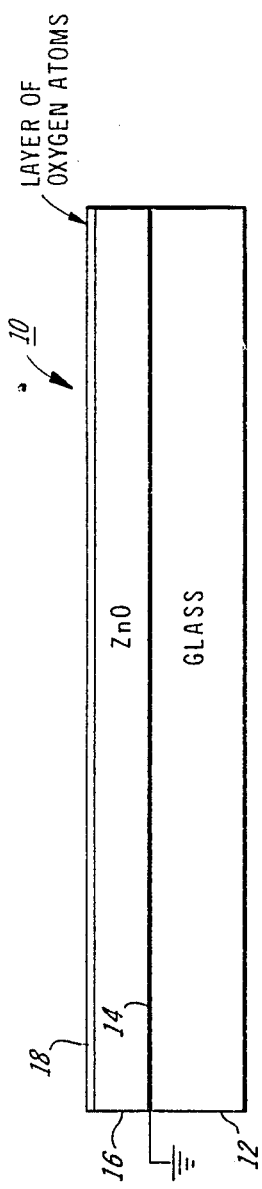
FIG. 1 is a diagrammatic side elevation of a representative example of a recording medium comprising this invention.

Reference is first made to the attributes of the record medium comprising this invention. In FIG. 1, there is shown a representative example of such a medium. The medium 10 comprises a support 12 in form of a substrate, e.g., glass or plastic. A thin metal layer 14 is deposited on the surface of support 12. Layer 14 may be deposited by vacuum deposition or sputtering and may comprise, for example, aluminum, copper, nickel or the like.

An electrically conductive layer 16 of an adsorbent carrier, such as zinc oxide, ZnO, is deposited on the conductive layer 14. The thickness of the adsorbent carrier 16 is not particularly critical. For example, it may be 1 mm or less, as long as the carrier surface is sufficiently smooth. The adsorbent carrier 16 may be deposited by means of sputtering to obtain a layer with high uniformity and very smooth surface properties. It is preferred that layer 16 be in the form of a single crystal whose surface is free of defects and consists of a single crya single crystal plane of the material with constant work function.

On the surface of ZnO adsorbent carrier 16, there is deposited an atomic coat 18 comprising a monolayer of adsorbate atomic particles that have an adsorption affinity or adhesion relative to the adsorbent carrier. One species of adsorbate atomic particles is oxygen in the case of a ZnO adsorbent carrier. As is known in the art of ZnO as image receptor, oxygen atoms or ions attracted to the surface of ZnO are held by the adsorption phenomena. ZnO has a natural negative charge. Upon reaching to the surface, the oxygen atoms will attract an electron from the ZnO and remain in adsorbtive adherence with the ZnO surface.

One class of media comprising this invention may consist of an adsorbent carrier upon which, in one embodiment, may be coated with a substantially uniform adsorbate atomic layer held to the absorbent surface due to electrical charge attraction. The adsorbent carrier may have electrically conductive, semiconductive, or low conductive properties.

While the phenomena of adsorbtion is specifically exemplified here, if should be understood by those skilled in the art that the generic principal to be utilized in the practice of this invention is the selection of an atomic particle that has an affinity or attraction, albeit electrical or chemical or physical, to a carrier surface, with the important understanding that the force of such an affinity or attraction is a stable adhesion (vis a vis, for example, a chemical bond) between the atomic particle and the carrier surface. By "adhesion", we mean intermolecular or interatomic forces or attraction holding the atomic particle to the carrier surface with sufficient stability and equilibrium requiring work to pull them apart due to such forces or attraction, which are believed to be primarily electrical in nature. The amount of work necessary must be sufficiently high so that minimal disturbances to the atomic particles will not free them from the carrier surface. Rather, it takes an applied force, such as an electron beam or an applied tunnel current, of sufficient magnitude to overcome such forces to bring about particle removal. Types of adhesion contemplated in the practice of this invention are adsorbtion, cohersion or van der Waals forces.

In the case of oxide adsorption type media, other potentially useful adsorbent carriers comprise $ZnIn_2S_4$, $In_2O_3$ and $TiO_2$, wherein the adsorbate atomic particle employed may be oxygen. Another example of an adsorption type media is a monolayer of sulfur on CdS. Sulfur has a preferential adsorption on CdS. An alternative media capable of forming an adhesion bond is an atomic monlayer of gold coated on a conductive carrier which consists of a smooth surface of single crystal, such as, for example, silicon.

In the medium embodiment of FIG. 1, a uniform layer 18 of adsorbate atomic particles of oxygen atoms may be provided by exposing the surface adsorbent carrier 16 to air for a sufficiently long time to allow its surface to adsorb an oxygen monolayer due to such exposure. On the other hand, more rapid and complete adsorption may be obtained by the application of negative corona in air to generate negative oxygen ions which become strongly bound to the adsorbent surface resulting in a uniform monolayer 18 of atoms.

Figure 2:
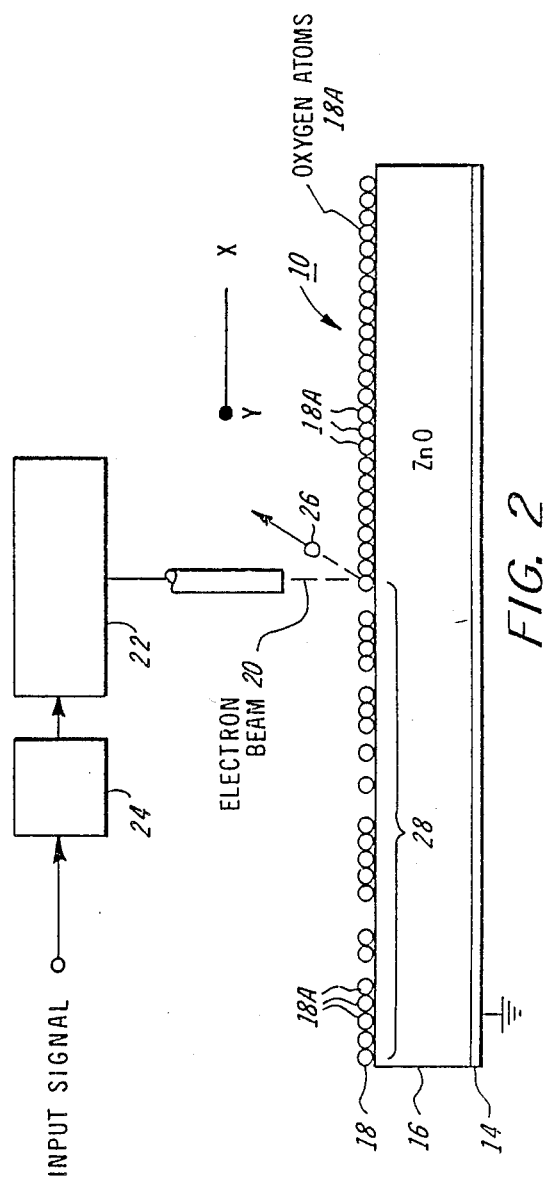
FIG. 2 is a diagrammatic side elevation for illustrating one method of recording comprising this invention.
Figure 3:
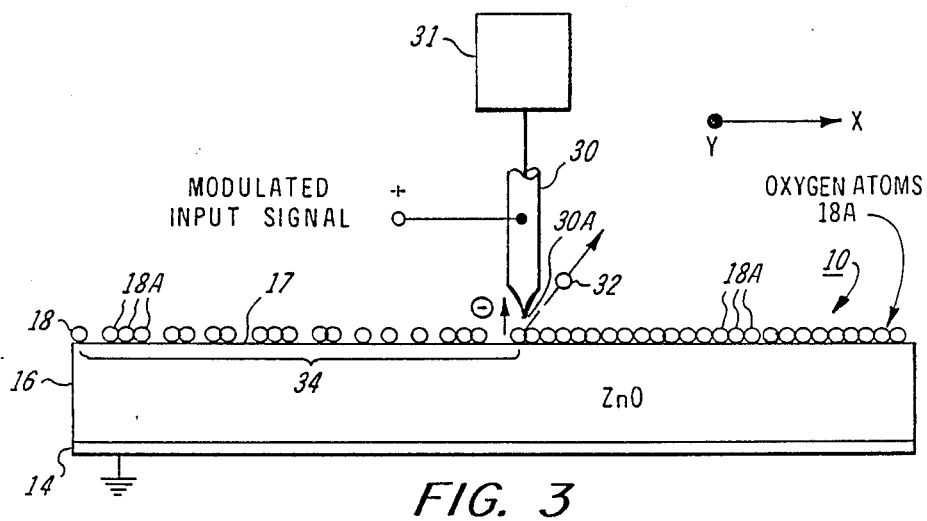
FIG. 3 is a diagrammatic side elevation for illustrating a second method of recording comprising this invention.

Generically, the information to be recorded on the surface of the adsorbent carrier is formed by adding to or removing from the adsorbent carrier surface individual adsorbate atoms. While the medium 10 in FIG. 1 represents a medium adapted for the case of removing adsorbate atoms, since the of atomic monolayer 18 is already applied to the adsorbent carrier surface, the present invention also includes the concept of depositing or otherwise adding individual adsorbate atomic particles to a base adsorbent surface as a method of recording. The latter is illustrated in connection with FIG. 4, while FIGS. 2 and 3 illustrate methods of recording utilizing the medium 10 of FIG. 1 involving the removal of adsorbate atomic particles from the monolayer 18. In any case, the absence of an adsorbate atomic particle from the adsorbent carrier surface, such as due either to deadsorbtion of an adsorbate particle or intentional nondepostion of an adsorbate particle, may represent one form of a stored binary state while an adsorbate atomic particle left on the adsorbent carrier surface or a preferentially deposited adsorbate atomic particle on a bare adsorbent carrier surface may represent another form of a stored binary state.

While FIG. 1 represents an enlarged view of medium 10, FIGS. 2-7 represent exaggerated illustrations of such a recording medium for purposes of illustration.

As shown in FIG. 2, the surface of the monolayer 18 comprises a uniform layer of oxygen (O−) atoms 18A on the adsorbent carrier ZnO supported on the conductive electrode 14 maintained at ground or reference potential. The surface is scanned in the X direction (with parallel scan line indexing in the Y direction out of the plane of FIG. 2) with an electron beam 20 having a very small spot size, e.g. 5 Å (0.5 nm) to 10 Å (1 nm). The electron beam 20 is produced by a conventional electron optical system 22 such as employed in an electron microscope.

The current in the electron beam 20 is modulated via modulator 24 by an input signal to be recorded during the X direction scanning of beam 20. This generates electron-hole pairs locally in the ZnO. The hole then combines with the electron attached to the adjacent oxygen (O−) atom, neutralizing its change and permitting its deadsorption from the surface of adsorbent carrier 16 as illustrated at 26 in FIG. 2. The remaining pattern of adsorbed oxygen (O−) atomic particles on the surface of the adsorbent carrier 16 will correspond to modulated input signal during X direction scanning, as illustrated by the portion of the X scan line of adsorbate atomic particles along the X scan length represented by bracket 28 and thus representative of binary recorded information.

FIG. 3 represents another recording method involving the removal of adsorbate atomic particles 18A. A metal stylus or electrode 30 has its very fine electrode tip 30A positioned about 10 Å (1 nm) above the surface of the uniformly coated adsorbate monolayer 18 and is scanned in the X direction utilizing, for example, a X and Y piezoelectric driving means 31. At the same time, an input signal of positive potential of several volts, e.g. 5 volts, is modulated according to the data to be recorded. The applied peak value of the modulated voltage is of energy level necessary to cause an electron to tunnel from the oxygen (O−) atom to the metal electrode resulting in the neutralization of the atom and its deadsorption as illustrated at 32 in FIG. 3.

Thus, a linear pattern of adsorbed oxygen (O−) atomic particles 18A will remain on the surface of the adsorbent carrier 16 in accordance with the modulated signal or pulses applied to electrode 30 while the remaining pattern of the adsorbate atomic particles along the X scan length represented by bracket 34 is representative of points where the energy level of the modulated signal or pulses were below the level necessary to neutralize an oxygen (O−) atom.

It should be noted that the integrity of the recorded surface of adsorbate atomic particles 18A may be maintained by sweeping away deadsorbed atomic particles illustrated at 26 and 32 of FIGS. 2 and 3 as well as other ambient contaminants that may be present in the region of the medium surface. This may be accomplished in one manner, for example, by providing a moving nitrogen atmosphere near the vicinity of the recorded surface.

Figure 4:
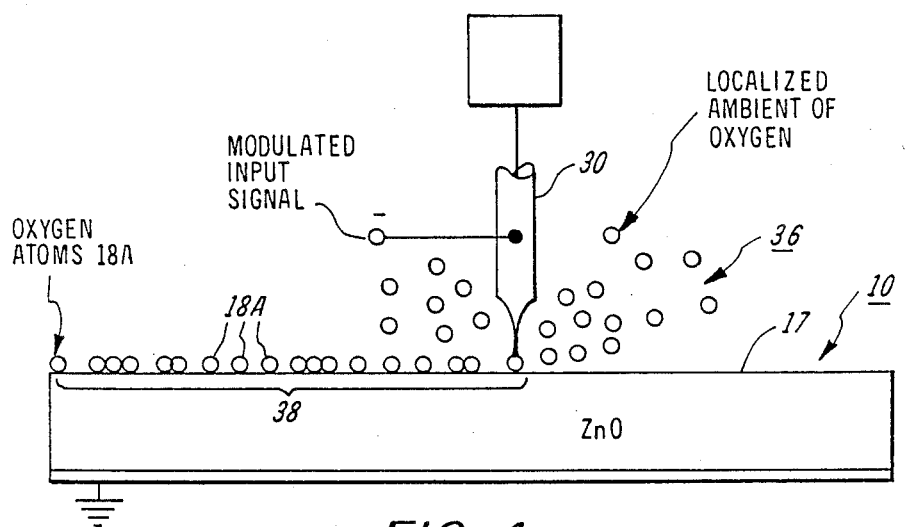
FIG. 4 is a diagrammatic side elevation for illustrating a third method of recording comprising this invention.

FIG. 4 illustrates a further method of recording wherein adsorbate atomic particles 18A are deposited on the adsorbent surface 17 of layer 16 during the writing process. The adsorbent surface 17 is initially cleaned of any contaminants and maintained as such, for example, by means of a protective ambient, such as nitrogen. The electrode 30 is scanned in the X direction while a modulated input signal of negative polarity or negative voltage pulses is applied to the fine electrode tip 30A in the presence of a localized or locally supplied adsorbate atomic ambient illustrated at 36. The localized ambient 36 comprises neutral oxygen atomic particles 18A that diffuse into the region between the electrode tip and the ZnO surface. A atomic particle 18B present in this region during a modulated high negative pulse will cause an electron to tunnel into the oxygen atomic particle 18B, resulting in the formation of an oxygen (O−) atom and its adsorbtion onto the ZnO adsorbent surface 17. In this manner, a linear pattern of induced adsorbed oxygen (O−) atomic particles 18A will be deposited on surface 17 in accordance with the modulated signal or pulses applied to electrode 30 forming the recorded pattern of adsorbate atomic particles along the X scan length represented by bracket 38.

As a practical application, in the recording methods illustrated in FIG. 2-4, a two dimensioned pattern of adsorbate atomic particles 18A will be produced by scanning in the X scan direction during recording of the information pattern while indexing in the Y direction to the next x scan line in conventional raster scan fashion. In order to effectuate recording via the tunnel current effect, the base conductive layer 14 and, correspondingly the adsorbent carrier 16, are maintained at ground or reference potential.

Figure 5:
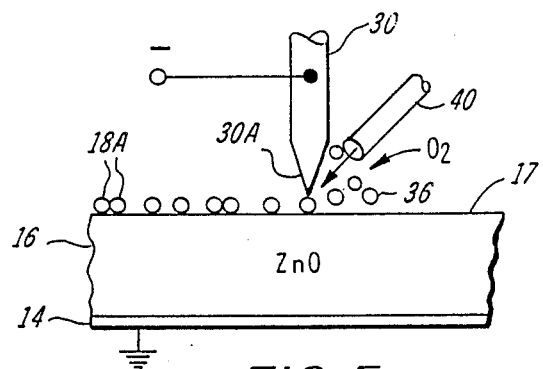
FIG. 5 is an alternative embodiment of the method illustrated in FIG. 4.
Figure 6:
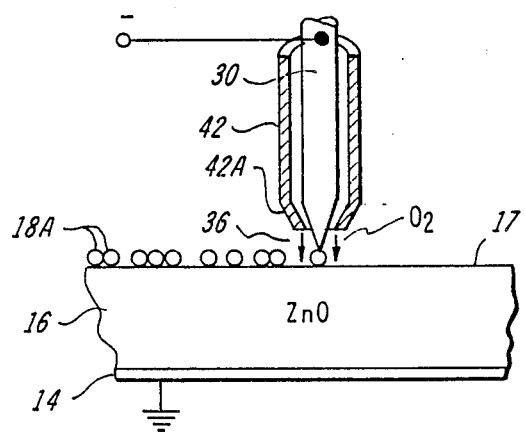
FIG. 6 is another alternative embodiment of the method illustrated in FIG. 4.

It is preferred in the recording embodiment of FIG. 4, that a controlled localized ambient of supplied neutral adsorbate atomic particles be maintained in the vicinity of electrode tip 30A and those particles not immediately utilized in the adsorbtion process by expeditiously removed from surface 17. As illustrated in FIG. 5, the adsorbate ambient 36 may be supplied to a confined vicinity of the fine electrode tip 30A by means of a supply tube 40 for direct application of the adsorbate atomic particles to the vicinity. Enhanced confinement of the adsorbate atoms to this region is illustrated in FIG. 6 wherein any outer sleeve or tube 42 with a tapered tip 42A is provided over the electrode 30 with the adsorbate atomic particle flow provided through the spacing between electrode 30 and tube 42.

Reference is now made to the method of readout of the recorded information illustrated in the embodiments of FIGS. 1-6. Reference is again made to the references of Binnig et al. wherein the technique of the tunnel current effect is employed to determine the topography of a surface under investigation wherein the position of the probe or electrode is altered according to variations in surface contour, such alteration determined by monitoring changes in tunnel current between the probe or electrode and the surface under investigation. In one form of the method of readout illustrated here, the electrode is maintained at the same spatial distance from the adsorbate atomic surface and the adsorbent carrier surface without physical contact with the adsorbate atomic surface and variations in the tunnel current are sensed at electrode 30 and are representative of the pattern of adsorbate atomic particles remaining on the adsorbent recording medium carrier surface.

Figure 7:
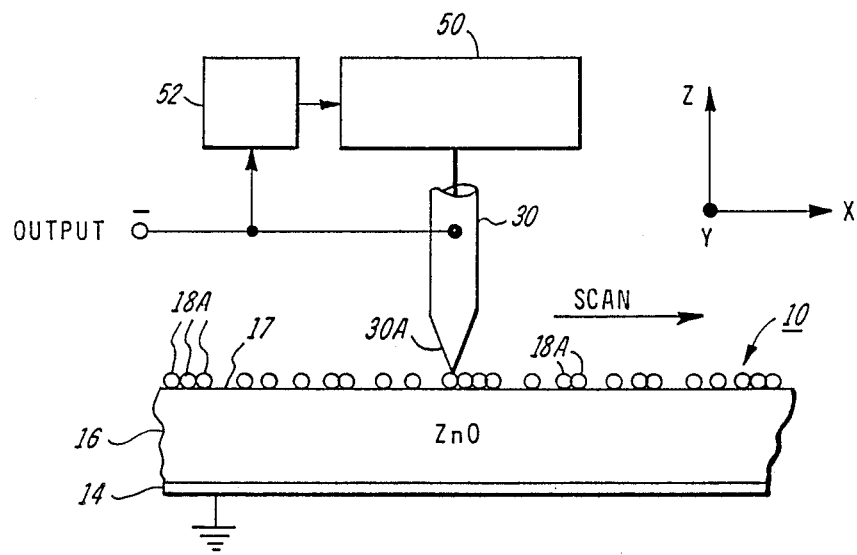
FIG. 7 is a diagrammatic side elevation for illustrating a method of readout of recorded information on a recording medium.

To readout the information, the surface of the medium is scanned in the X and Y directions with electrode 30 driven by piezoelectric or servo drive means 50, as illustrated in FIG. 7. A constant negative voltage is maintained on electrode 30. For example, the electrode tip 30A may be maintained at about 10 Å (1 nm) above the surface of medium 10 and a voltage maintained on the electrode may be about 5 volts. Electrons from electrode tip 30A will tunnel into the ZnO carrier or an oxygen (O—) atom on the surface of the ZnO carrier. Variations in tunnel current at the electrode are monitored and variations in the tunnel current as the electrode is scanned in the X direction are representative of the surface topography along the X scan line, i.e., the presence or absence of adsorbate atomic particles 18A and providing an electrical signal representation of originally recorded information.

In readout, the applied voltage should not be of a polarity that would attract, deadsorb or otherwise cause removal of the adhering atomic particles to the carrier surface. In the case of oxygen (O—) atoms adhering to the carrier surface, the voltage of applied to electrode tip 30A should be of negative polarity, since a readout polarity of sufficient magnitude would cause deadsorbtion of the record atomic particles.

It should be realized that the technique of Binnig et al. utilized in STM, i.e., varying the electrode in vertical or Z direction in accordance with variations in tunnel current, can also be utilized in recording readout. Electrode 30 is moved in the Z direction by piezoelectric or servo drive means 50 using a closed loop feedback system 52 to sense the tunnel current and provide a control signal to the servo drive means 50 that operates to correspondingly increase or decrease the distance between the electrode tip 30A and the medium surface 17 to maintain a constant spatial distance therebetween base upon respective decreases and increases in the sensed tunnel current. The varying current or servo drive means corresponds to the recorded surface topography formed by the adsorbate atomic particles and exposed adsorbent carrier surface.

In order to increase the signal to noise ratio and the accuracy of readout, the following technique may be utilized. It is recognized in the nature of physics that it is not readily possible to obtain an absolutely smooth and uniform surface, which is most desired for the recording methods of this invention.

The surface of the adsorbent carrier, having been cleaned of all contaminants, is scanned in conventional raster scan fashion as illustrated in FIG. 7 to "readout" via the tunnel current effect the topography of smooth surface 17. This topography is stored for each particular scanned medium carrier. Subsequently, information is recorded on carrier surface 17 in accordance with the teachings of this invention as illustrated in FIGS. 2–6. Of course, in the case of FIGS. 2 and 3, the monolayer of adsorbate atomic particles is initally deposited prior to application of the recording method.

Upon subsequent readout, an electrical signal is obtained in the manner illustrated in FIG. 7, i.e., according to variations in tunnel current ascertained in orthogonal scan of the recorded information. Then, the scanned information signal for recording scan lines is combined with the same or identical scan record lines of surface topography recorded prior to information recording and the difference in corresponding signal values is ascertained, providing a highly accurate representation of the recorded information.

This method of accurate readout has the added security of providing cryptographic techniques to the originally recorded topography of surface 17 and subsequently recorded information on medium 10 so that the subsequently recorded information on a particular recording medium will be of no substantive value without the encrypted originally recorded topography of the same medium, which is stored in another separate location.

Basically, scanning for readout is accomplished in raster scan fashion in the same way as recording of information. To record large amounts of information, a large disk may be utilized which is coated with an adsorbent carrier film of a selected material having sufficient surface smoothness to which adsorbate atomic particles may be adsorbed or removed from an adsorbed monolayer of such atoms. In operation, the disk may be stationary while the electrode is scanned in the X and Y directions for purposes of recording and reading binary information. The recording and readout may be done in selected areas of the disk and the disk may then be indexed to new areas for further recording of information. Alternatively, the disk may be rotated continuously with the electrode remaining stationary or the disk may be rotated at a velocity as the electrode is moved radially along a line perpendicular to the rotational disk movement to record and readout binary information in previously designated sector of the disk.

While the invention has been described in conjunction with specific embodiments, it is evident that many alternatives, modifications and variations will be apparent to those skilled in the art in light of the foregoing description. For example, other types and classes of carriers and associated atomic particles having adsorptive or other types of stable adhesion properties relative to each other may be utilized in the practice of this invention.

Also, the adhesion forces of the electrical charge type may be of the opposite polarity as compared to that illustrated herein, i.e., a positive ion effect. This, of course, depends upon the carrier/particle regime chosen for the recording medium.

Also, the invention herein contemplates as a means of creating a topography representative of recorded information the removal of atomic particles, which are initially an integral part of a smooth bare carrier surface, but are removed due to a stable adhesion to the surface. Recording (particle removal) may be accomplished by the electron beam technique illustrated in FIG. 2 or the tunnel current effect illustrated in FIG. 3. The recorded "dents" formed in the carrier surface, representative of recorded information, may be readout by means of the system illustrated in FIG. 7.

Accordingly, this invention is intended to embrace all such alternatives, modifications, and variations as fall within the spirit and scope of the appended claims.

What is claimed is:

1. In the method of atomic scale recording and readout of information wherein a readout electrode means is scanned across the surface of a carrier having adhesion properties for an associated atomic particle, the pattern of said particles formed on said carrier representative of recorded information and comprising the steps of determining the topography of said carrier surface prior to recording information on the surface of said carrier by applying a voltage to said readout electrode means creating a tunnel current between said electrode means and the surface of said carrier and scanning said electrode across said carrier surface, the nonrecord output signal at said electrode comprising variations of said tunnel current at said electrode representative of said carrier surface topography, selectively supply said atomic particles to the surface of said recording electrode means by inducing said particle to adhere to the surface thereof, the pattern of said atomic particles on the surface of said carrier representative of recorded information, determining again the topography of said carrier surface by applying a voltage to said readout electrode means creating a tunnel current between said electrode means and the surface of said carrier and scanning said electrode across said carrier surface, the record output signal at said electrode comprising variations of said tunnel current representative of the presence or absence of said atomic particles on the surface of said carrier, and producing a resultant readout information signal having high signal-to-noise ratio by taking the identically scanned difference between said record output signal and said nonrecord output signal.

2. A method of atomic scale recording and readout of binary formatted information on an associated recording medium comprising the steps of:

providing an adsorbent carrier having adsorbent properties for adsorbate atomic particles, said adsorbate atomic particles having a stable adhesion bond relative to said adsorbent carrier, depositing a uniform layer of adsorbate atomic particles on a surface of said absorbent carrier, scanning in raster scan fashion said carrier surface with recording electrode means having a probe with its tip in close proximity to said carrier surface, applying a modulated information signal to said recording electrode means during the step of scanning wherein the applied signal peak values are of sufficient magnitude to create a tunnel current effect between said probe tip and said adsorbent carrier to sequentially induce individual of said adsorbate atomic particles to be released form said bond with said carrier surface according to said modulated signal, the pattern of said adsorbate atomic particles remaining on said carrier surface representative of binary formatted information, scanning in raster scan fashion said carrier surface while maintaining a voltage between said probe tip and said adsorbent carrier to create a tunnel current therebetween, monitoring variations in said tunnel current during said scanning step, said variations due to the presence or absence of said adsorbate atomic particles on said carrier surface and representative of said binary formatted information.

3. The method of atomic scale recording and readout of claim 2 wherein said adsorbate atomic particles are selected from the group consisting of O, S and Au atomic particles and said adsorbent carrier surface comprises ZnO, $ZnIn_2S_4$, $In_2O_3$, $TiO_2$, CdS or Si.

4. The method of atomic scale recording and readout of claim 2 wherein said layer of adsorbate atomic particles comprises a monolayer of O— particles and said adsorbent carrier comprises ZnO, each of said modulated information signal peak values comprise a positive pulse to induce an electron to tunnel from a selected O— particle adjacent to said probe tip to neutralize said selected O— particle and cause its deadsorption from said carrier surface.

5. The method of atomic scale recording and readout of claim 2 including the step of utilizing variations in said tunnel current as a control signal to maintain a constant spatial distance between said probe tip and the surface of both said carrier and said adsorbate atomic particles on said carrier, variations in said control signal representative of said binary formatted information.

6. A method of atomic sale recording and readout of binary formatted information on an associated recording medium comprising the steps of:

providing an adsorbent carrier having adsorbent properties for adsorbate atomic particles, said adsorbate atomic particles having a stable adhesion bond relative to said adsorbent carrier, scanning in raster scan fashion said carrier surface with recording electrode means having a probe in close proximity to said carrier surface, maintaining a localized ambient of electrically neutral adsorbate atomic particles in the immediate vicinity of said electrode means probe, applying a modulated signal information to said recording electrode means during the step of scanning wherein the applied signal peak values are of sufficient magnitude to create a tunnel current effect between said probe tip and said adsorbent carrier to sequentially induce individual of said adsorbate atomic particles to become adsorbent and to individually adhere to said carrier surface and form said bond with said carrier surface according to said modulated signal and hence deposited thereon, the pattern of said adsorbate atomic particles selectively and sequentially deposited on said carrier surface representative of binary formatted information, scanning in raster scan fashion said carrier surface while maintaining a voltage between said probe tip and said adsorbent carrier to create a tunnel current therebetween, monitoring variations in said tunnel current during said scanning step, said variations due to the presence or absence of said adsorbate atomic particles on said carrier surface and representative of said binary formatted information.

7. The method of atomic scale recording and readout of claim 6 wherein said adsorbate atomic particles are selected from the group consisting of O, S and Au atomic particles and said adsorbent carrier surface comprises ZnO, $ZnIn_2S_4$, $In_2O_3$, $TiO_2$, CdS or Si.

8. The method of atomic scale recording and readout of claim 6 wherein said ambient of adsorbate atomic particles comprise O atoms and said adsorbent carrier comprises ZnO, each of said modulated information signal peak values comprise a negative pulse to tunnel into an ambient O particle at said probe tip to form an O— particle and cause its adsorption onto said ZnO carrier surface.

9. The method of atomic scale recording and readout of claim 6 including the step of utilizing variations in said tunnel current as a control signal to maintain a constant spatial distance between said probe tip and the surface of both said carrier and said adsorbate atomic particles on said carrier, variations in said control signal representative of said binary formatted information.

10. An atomic scale recording and readout information system for recording binary formatted information including a recording medium comprising an adsorbent carrier, a layer of adsorbate atomic particles deposited on a surface of said adsorbent carrier wherein said particles have an adsorptive affinity for said adsorbent carrier due, at least in part, to the electrical charge attraction properties of said adsorbent carrier, recording electrode means having a probe positioned with its tip in proximity to said carrier surface, means to scan said carrier surface with said recording electrode means probe in raster scan fashion, means to apply a modulated information signal to said recording electrode means wherein the applied signal peak values are of sufficient magnitude to create a tunnel current effect between said probe tip and said adsorbent carrier to sequentially induce individual of said deposited adsorbate atomic particles to be released from said carrier surface, the patter of said adsorbate atomic particles remaining on said carrier surface representative of binary formatted information, means to scan said carrier surface relative to said probe tip in raster scan fashion, means to maintain a voltage between said probe tip and said adsorbate carrier to create a tunnel current therebetween, variations in said tunnel current occurring during said scanning due to the presence or absence of said adsorbate atomic particles on said carrier surface and representative of said binary formatted information.

11. The atomic scale recording and readout information system of claim 10 wherein said adsorbate atomic particles are selected from the group consisting of O, S and Au atomic particles and said adsorbent carrier surface comprises ZnO, $ZnIn_2S_4$, $In_2O_3$, $TiO_2$, CdS or Si.

12. The atomic scale recording and readout information system of claim 10 wherein said layer of adsorbate atomic particles comprises a monolayer of O— particles, each of said modulated information signal peak values comprise a positive pulse to induce an electron to tunnel from a selected O— particle adjacent to said probe tip to neutralize said selected O— particle and to cause its deadsorption from said carrier surface.

13. An atomic scale recording and readout information system for recording binary formatted information including a recording medium comprising an adsorbent carrier, recording electrode means having a probe positioned with its tip in proximity to a surface of said adsorbent carrier, a localized ambient of electrically neutral adsorbate atomic particles in the immediate vicinity of said probe tip, means to scan said carrier surface with said recording electrode means probe in raster scan fashion, means to apply a modulated information signal to said recording electrode means wherein the applied signal peak values are of sufficient magnitude to create a tunnel current effect between said probe tip and said adsorbent carrier to sequentially induce individual of said ambient adsorbate atomic particles to become adsorbent and to individually adhere to said carrier surface and hence deposited thereon, the pattern of said adsorbate atomic particles selectively and sequentially deposited on said carrier surface representative of formatted binary recorded information, means to scan said carrier surface relative to said probe tip in raster scan fashion, means to maintain a voltage between said probe tip and said adsorbate carrier to create a tunnel current therebetween, variations in said tunnel current occurring during said scanning due to the presence or absence of said adsorbate atomic particles on said carrier surface and representative of said binary formatted information.

14. The atomic scale recording and readout information system of claim 13 wherein said adsorbate atomic particles are selected from the group consisting of O, S and Au atomic particles and said adsorbent carrier surface comprises ZnO, $ZnIn_2S_4$, $In_2O_3$, $TiO_2$, CdS or Si.

15. The atomic scale recording and readout information system of claim 13 wherein said ambient of adsorbate atomic particles comprise O atoms and said adsorbent carrier comprises ZnO, each of said modulated information signal peak values comprise a negative pulse to tunnel into an ambient O particle at said probe tip to form an O— particle and to cause its adsorption onto said carrier surface.

16. A recording and readout information system having atomic scale densities comprising a recording medium having an adsorbent carrier, recording means to scan electrode means across the surface of said adsorbent carrier and to deposit adsorbate atomic particles onto the surface of said adsorbent carrier representative of information recorded on said recording medium, said particles having an adsorptive affinity for said adsorbent carrier due, at least in part, to the electrical charge attraction properties of said adsorbent carrier and induced by said electrode means on an adsorbate atomic particle, readout means to scan the surface of said adsorbent carrier with said electrode means at a preselected spatial distance above said carrier, means to apply a potential to said electrode means and sense variations in tunnel current established between said electrode means and said adsorbent carrier, the electrical signal produced by said tunnel variations representative of the pattern of recorded information on the surface of said adsorbent carrier.

17. A method of atomic scale recording and readout comprising the steps of providing an adsorbent carrier having adsorption properties for adsorbate atomic particles, supplying a uniform monolayer coat of said adsorbate atomic particles to the surface of said carrier, said particles adhering to said adsorbent carrier due to adsorptive adhesion bond, scanning electrode means across the surface of said adsorbent carrier while selectively applying a voltage to said electrode means of sufficient magnitude to deadsorb selected of said adsorbate atomic particles, the remaining pattern of said adsorbate atomic particles on said adsorbent carrier representative of recorded information, scanning said electrode means across the surface of said adsorbent carrier while applying a voltage of said electrode means creating a tunnel current between said electrode means and said adsorbent carrier, variations of said tunnel current representative of the presence or absence of said atomic particles on the surface of said carrier and representative of said recorded information.

18. In the method of atomic scale recording and readout of information on the surface of a carrier having adhesion properties for associated atomic particles comprising the steps of supplying a localized ambient of said atomic particles in the vicinity of said carrier surface adjacent to electrode means, applying a voltage to said electrode means as said electrode means is scanned across the surface of said carrier, said voltage being of sufficient magnitude to induce said atomic particles to adhere to said carrier surface, the pattern of said atomic particles on said carrier surface representative of recorded information, scanning said electrode means across the surface of said carrier while applying a voltage of said electrode means creating a tunnel current between said electrode means and said carrier, variations of said tunnel current representative of the presence or absence of said atomic particles on said carrier surface and representative of said recorded information.

* * * * *